(12) United States Patent
Aemisegger et al.

(10) Patent No.: US 8,989,941 B2
(45) Date of Patent: Mar. 24, 2015

(54) MANEUVERING DRIVE WITH SMART CENTRAL UNIT

(71) Applicant: Truma Geraetetechnik GmbH & Co. KG, Putzbrunn (DE)

(72) Inventors: Steve Aemisegger, Munich (DE); Daniel Gumpp, Neusaess (DE); Jochen Mueller, Moosach (DE); Tobias Schmid, Erding (DE); Klaus Muessler, Egenburg (DE); Ana Maria Fernandez, Munich (DE); Joerg Mueller, Egmating (DE); Oliver Schaurer, Oberding (DE); Mario Moehring, Gammelsdorf (DE); Mathias Venschott, Munich (DE); Stefan Thiel, Rosenheim (DE); Kamil Zawadski, Haar (DE)

(73) Assignee: Truma Geraetetechnik GmbH & Co., KG, Putzbrunn (DE)

( * ) Notice: Subject to any disclaimer, the term of this patent is extended or adjusted under 35 U.S.C. 154(b) by 0 days.

(21) Appl. No.: 14/058,927

(22) Filed: Oct. 21, 2013

(65) Prior Publication Data
US 2014/0114521 A1   Apr. 24, 2014

(30) Foreign Application Priority Data
Oct. 22, 2012   (DE) ..................... 20 2012 010 078 U

(51) Int. Cl.
*B62D 59/04* (2006.01)
*H02H 7/08* (2006.01)
(Continued)

(52) U.S. Cl.
CPC . *B60S 9/00* (2013.01); *B62D 59/04* (2013.01); *B60L 11/1805* (2013.01); *B60L 11/1807* (2013.01); *B60L 15/20* (2013.01); *B60L 2200/28* (2013.01); *B60L 2200/46* (2013.01); *B60L 2220/44* (2013.01); *B60L 2240/36* (2013.01); *B60L 2240/421* (2013.01); *B60L 2240/461* (2013.01); *B60L 2240/645* (2013.01); *B60L 3/0061* (2013.01); *B60L 3/04* (2013.01);
(Continued)

(58) Field of Classification Search
CPC ....... B62D 59/04; B60S 9/00; B60L 11/1807; B60L 11/1805; B60L 15/20; B60L 15/2036; B60L 3/0061; B60L 2200/46; B60L 2200/28; B60L 2200/44; B60L 2240/36; B60L 2240/421; B60L 2240/461; B60L 2240/425; Y02T 10/642
See application file for complete search history.

(56) References Cited

U.S. PATENT DOCUMENTS 6,758,291 B1 * 7/2004 Koch .............................. 180/11
2008/0211289 A1 * 9/2008 Beiler et al. ................. 298/19 R

FOREIGN PATENT DOCUMENTS

| DE | 20 2009 005 524 U1 | 8/2009 |
|----|--------------------|--------|
| DE | 20 2010 008 600 U1 | 2/2012 |

(Continued)

*Primary Examiner* — Michael J Zanelli
(74) *Attorney, Agent, or Firm* — McNees Wallace & Nurick LLC

(57) ABSTRACT

A maneuvering drive (24, 30) for a trailer (10) has a central unit (30), at least two drive units (24) by which wheels (16) of the trailer (10) can be driven and which are controlled by the central unit (30), each drive unit (24) including a checking module (40) by which drive specifications of the central unit (30) can be checked as to whether they can be fulfilled, and a feedback channel being provided by which the drive units (24) can feed back to the central unit (30) if the drive specifications cannot be fulfilled.

13 Claims, 3 Drawing Sheets

(51) Int. Cl.
*B60S 9/00* (2006.01)
*B60L 11/18* (2006.01)
*B60L 15/20* (2006.01)
*B60L 3/00* (2006.01)
*B60L 3/04* (2006.01)

(52) U.S. Cl.
CPC ......... *B60L15/2036* (2013.01); *B60L 2220/46* (2013.01); *B60L 2240/425* (2013.01); *Y02T 10/7005* (2013.01); *Y02T 90/16* (2013.01); *Y02T 10/642* (2013.01); *Y02T 10/70* (2013.01)
USPC .................. 701/22; 701/42; 701/69; 180/6.5; 180/14.2

(56) References Cited

FOREIGN PATENT DOCUMENTS

| | | | |
|---|---|---|---|
| EP | 0827898 A1 | * | 3/1998 |
| EP | 1826107 A2 | * | 8/2007 |
| EP | 1886905 A1 | | 2/2008 |
| EP | 2409903 A1 | | 1/2012 |
| EP | 2455275 A2 | | 5/2012 |
| GB | 2371278 A | * | 7/2002 |

* cited by examiner

MANEUVERING DRIVE WITH SMART CENTRAL UNIT

FIELD OF THE INVENTION

The present invention relates to a maneuvering drive for a trailer.

BACKGROUND

This trailer may be, for example, a travel trailer, a boat trailer, a horse trailer, a market trailer or the like, which is typically towed by a tractor or towing vehicle. For a travel trailer, in most cases a passenger car serves as the towing vehicle. In order to bring the trailer to its final position, for example on a campground, it is usually unhitched from the towing vehicle and pushed to its final position by hand. But this often involves major efforts since, as the requirements on the comfort of such travel trailers increase, the weight thereof also increases.

To make maneuvering easier, trailers may be equipped with maneuvering drives. A maneuvering drive is an auxiliary drive which in most cases has a drive unit with an electric motor for each wheel of the trailer. The electric motors are supplied with electrical energy by a battery in the trailer and may be coupled to the wheels of the trailer to drive them and maneuver the trailer in this way.

When it is intended to maneuver the trailer, an operator may, for example, actuate the drive motors of the maneuvering drive via a remote control. In the simple case of a trailer with one axle and therefore two wheels, the maneuvering drive includes two motors which, when the trailer is intended to be shifted in a straight line, should rotate at the same speed. In practice, however, frequently speed differentials occur, which result, for example, from differences in the ground (asphalted path on one side of the trailer, sand on the other side) and different rolling resistances resulting therefrom, or else from slight differences in the power of the drive units of the maneuvering drive. In this case, the trailer will actually make a turn since that wheel of the travel trailer that is driven at the higher speed is ahead of the slower wheel. The operator then has to correct manually, so that rather than a travel straight ahead, in fact travel is frequently in a wavy line which iteratively approximates the desired travel path.

SUMMARY OF THE INVENTION

The object of the invention consists in providing a maneuvering drive for a trailer, which provides assistance to an operator when maneuvering the trailer and which makes it more easily possible to keep to the desired travel path.

To achieve this object, according to the invention provision is made for a maneuvering drive for a trailer, including a central unit, at least two drive units by which wheels of the trailer can be driven and which are controlled by the central unit, each drive unit including a checking module by which drive specifications of the central unit can be checked as to whether they can be fulfilled, and a feedback channel being provided by which the drive units can feed back to the central unit if the drive specifications cannot be fulfilled. The invention is based on the fundamental idea that the drive units of the central unit give a feedback at least when the driving power requirements specified by the central unit can not be fulfilled. This allows the central unit to adjust the overall drive specifications such that the desired maneuvering operation is achieved in the best possible way. In a simple example, it is assumed that for a travel straight ahead, the central unit specifies a speed of 1000 rpm for the drive motors. In an example with two drive units, one of the two drive motors of the drive unit manages to reach this specified speed, whereas the other only reaches a speed of 900 rpm. The feedback may now consist in that this drive unit feeds back to the central unit that a predefined current limit was reached before reaching the desired 1000 rpm. The central unit may inquire at the same time which speed the "slower" drive unit can reach; in this example merely 900 rpm. On the basis of this information, the central unit can reset the drive specification of the "faster" drive motor to 900 rpm or, preferably, to a somewhat lower value having a certain distance from the maximum achievable speed of the "slower" drive unit. This ensures that the trailer is moved straight ahead, rather than along a curve, as would be the case in a conventional system due to the speed differential between the two drive units. Generally speaking, based on the feedback from the drive units, the central unit can take the "weakest link of the chain" in the drive into consideration, so that any differences will not have an effect on the moving operation of the trailer.

Preferably, provision is made that the feedback of the drive units consists in a power reduction. A power reduction here is understood to mean a feedback to the central unit as to which reduced power can be reached by the respective drive unit instead of the power that is actually specified by the central unit. Thus, not only a feedback is given that the specified power is not possible, but a specific indication of the maximum power achievable by the respective drive unit.

A power reduction may be triggered in that a limit temperature in the drive unit is exceeded. In such a case, the drive unit feeds back to the central unit that only a reduced power is still provided, to prevent a further increase in temperature.

The power reduction may also be triggered in that a desired speed specified by the central unit is fallen short of. In line with the example outlined above, in this case the drive unit specifically feeds back which speed can be provided.

The power reduction may also be triggered in that in supplying a drive unit a current limit is reached before the respective drive motor has reached its desired speed.

As an alternative to the parameter of the speed of the drive motor of the drive means, the torque may also be made use of. But since a torque measurement in the drive units most often involves a greater effort than the determination of the speed of the drive motors, in practice usually the speed of the drive motors will be focused on.

A power reduction may also be triggered by a limit value of the voltage applied and/or of the current flowing being exceeded, in order to protect the drive motors of the drive units or to take the maximum power available from an energy source into account.

According to one configuration of the invention, provision is made that the central unit synchronizes the angular positions of the motor shafts of the drive units. In this way, a "rigid" shaft is provided between the drive units and thus the wheels on the two sides of the trailer by electronic means, so that when moving straight ahead, it can be ensured that the wheels of the trailer are driven at exactly the same speed. Assuming that no slip occurs between the wheels of the trailer and the ground, this ensures that the trailer can be moved exactly in a straight line.

According to a preferred embodiment of the invention, provision is made that when cornering, the central unit makes the drive specification for the drive unit(s) on the inside of the bend taking into account the feedback of the drive unit(s) on the outside of the bend. This ensures that even when cornering, the drive specifications made by the central unit can in fact be fulfilled by the drive units. For example, when a cornering is specified which requires 1100 rpm of the drive unit on the outside of the bend and 900 rpm of the drive unit on the inside of the bend while the outer drive unit feeds back that the maximum speed is 1000 rpm, the drive specification for the drive unit on the inside of the bend is proportionally lowered by the central unit, so that the desired curve radius is maintained. The central unit acts as an electronic differential gear here, which actively generates the speed differentials at the wheels of the trailer which are necessary for a desired cornering.

According to a further development of the invention, a sensor is provided which supplies a signal to the central unit which can be evaluated with regard to deviations of the trailer from a specified direction of travel. The sensor may be more particularly an acceleration sensor or an angular rate sensor which can be used in particular for immediately detecting yaw motions of the trailer. For example, when a movement straight ahead is controlled by the central unit, but a yaw motion is detected, for example because one wheel of the trailer passes through an unevenness of the ground, the central unit can counteract and ensure by suitable, differing drive specifications for the drive units that the trailer is still moved along a straight line.

BRIEF DESCRIPTION OF THE DRAWINGS

The invention will now be described below with reference to an embodiment which is illustrated in the accompanying drawings, in which.

DETAILED DESCRIPTION

Figure 1:
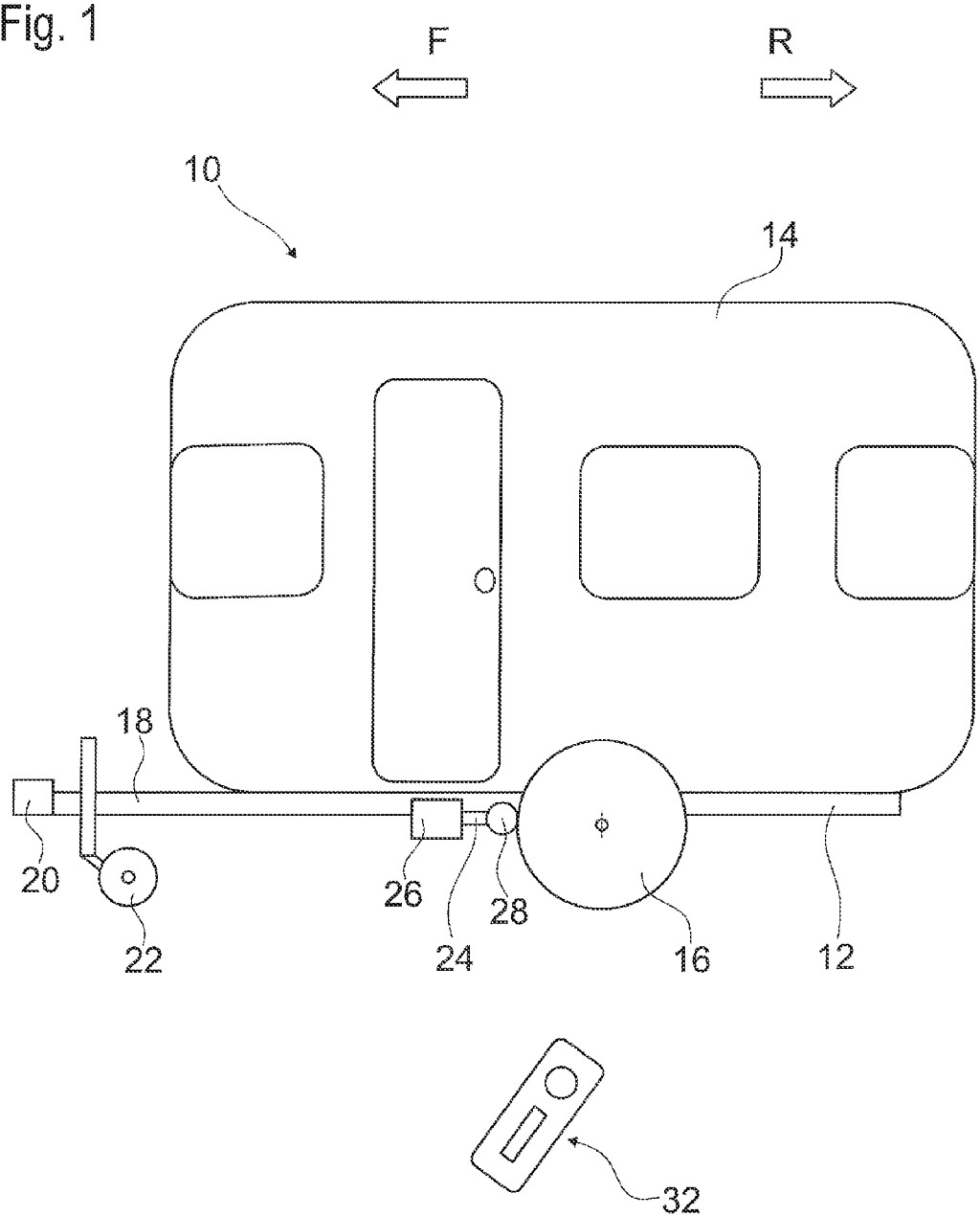
FIG. 1 shows a schematic side view of a trailer with a maneuvering drive.
Figure 2:
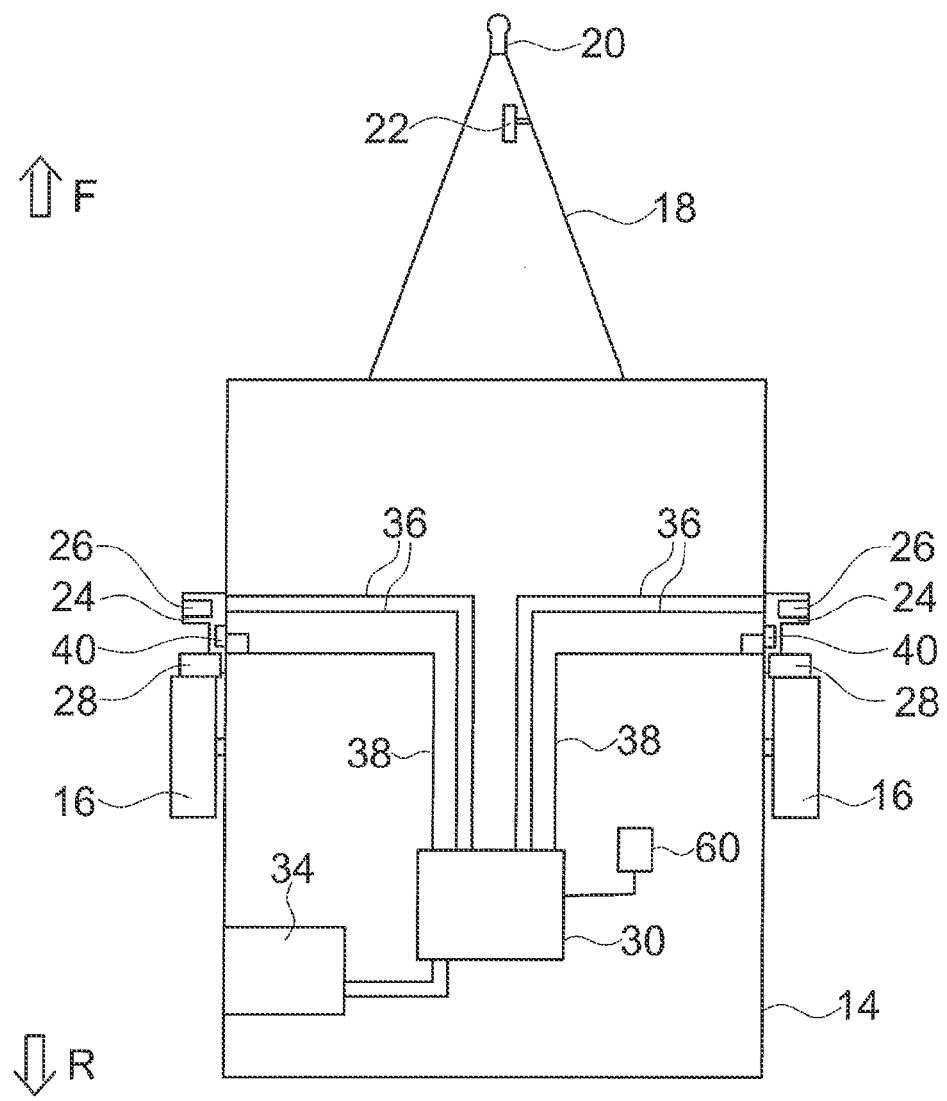
FIG. 2 shows a schematic plan view of the trailer of FIG. 1.

FIGS. 1 and 2 schematically show a trailer 10 (here a travel trailer) which includes a frame 12 to which a superstructure 14 is mounted. Further provided are a pair of wheels 16, a drawbar 18 and a coupling 20. The coupling 20 can be used for hitching the trailer 10 to a towing vehicle. Mounted to the drawbar 18 is an auxiliary wheel 22 which serves to support the trailer 10 in the unhitched condition.

Each wheel 16 of the trailer 10 has a drive unit 24 associated therewith. Each drive unit 24 includes a drive motor 26 which is typically in the form of an electric motor, as well as a drive roller 28 adapted to be driven by the drive motor 26. The drive roller 28 can be caused to engage with the associated wheel 16 of the trailer 10.

Further provision is made for a central unit 30 which serves as a central controller for the drive units 24 and is also responsible for the communication with an operator who may, for example, specify a straight ahead motion or a cornering motion, for example via a remote control 32 schematically shown in FIG. 1.

Furthermore provided in the trailer 10 is a voltage source 34 by means of which the central unit 30 and the drive units 24 can be supplied with electrical energy. The voltage source may be a power supply unit which is connected to an external power outlet, or an energy storage device on board the trailer. In this case, the energy storage device 34 typically is an accumulator, colloquially also often referred to as a battery. Here the drive motors 26 are connected to the central unit via connecting lines 36. Further, at least one control line 38 is provided for each drive unit, the control line extending from the central unit 30 to each drive unit 24.

The drive units 24 and the central unit 30 together form a maneuvering drive which can be used for shifting the trailer 10. For this purpose, the drive rollers 28 are caused to engage the wheels 16 of the trailer, so that they drive the wheels 16 when the drive motors 26 rotate. This is basically known from the prior art.

A single-axle trailer is shown here as an exemplary embodiment. Accordingly, the trailer 10 includes two wheels 16 each of which has a drive unit 24 associated with it. Basically, the same maneuvering drive can also be employed in a two-axle trailer. Still a total of only two drive units may be used here, so that one driven wheel and one non-driven wheel are provided on each side of the trailer, or else two drive units may be employed on each side of the trailer, so that each wheel of the trailer can be driven.

Figure 3:
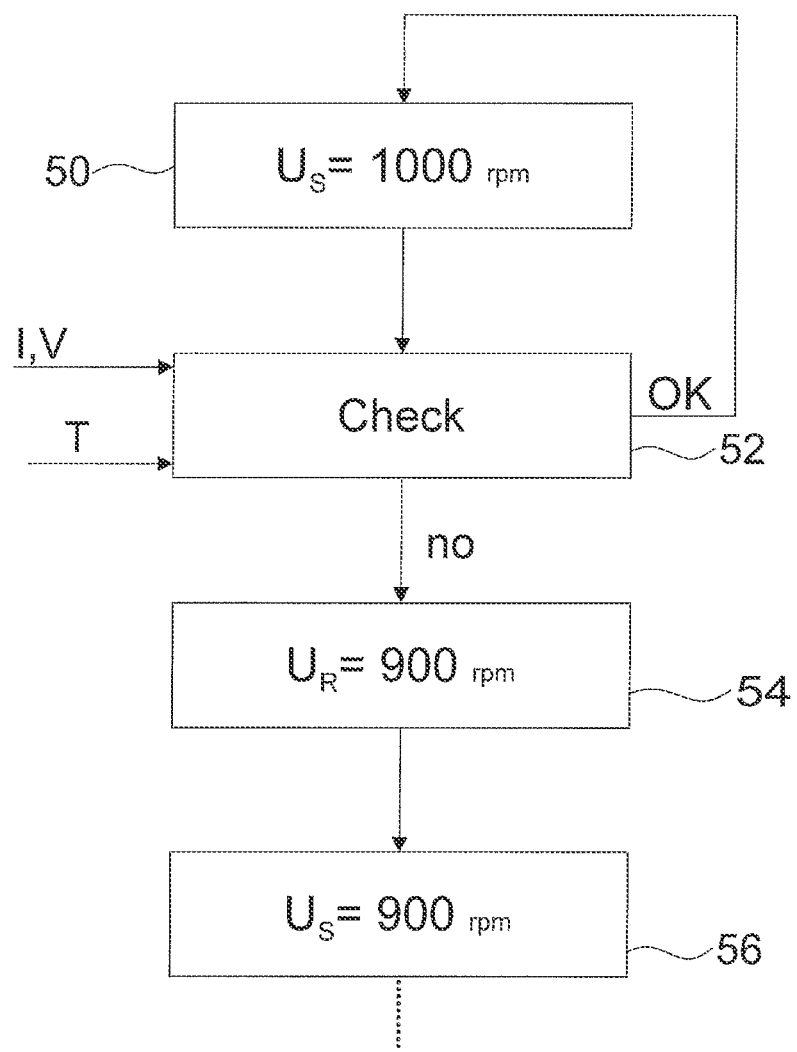
FIG. 3 schematically shows the control of the drive units by the central unit in a flow chart.

According to the invention, each drive unit 24 is provided with a checking module 40 by which each drive unit 24 can individually check for itself whether the drive specifications made by the central unit can be complied with. This is schematically shown in FIG. 3. Box 50 illustrates that the central unit 30 specifies to the drive units 24 a desired speed for the drive motors of 1000 rpm to shift the travel trailer straight ahead and forward, for example (see the arrows F in FIGS. 1 and 2). In the process, each drive unit 24 individually checks in the checking module 40 whether this drive specification can be fulfilled (see box 52 in FIG. 3).

The check need not be geared to the speed of the drive units that can actually be reached, but may also be geared to whether a desired speed is reached when a predefined current limit is taken into consideration. In this case, the current supplied to the drive motor 26 is increased until the desired speed has been reached. However, if the current limit, i.e. the maximum current made available by the battery, for example, is reached before reaching the desired speed, a feedback will be given to the checking module 40 that the current limit was reached before the drive motor 26 has reached the desired speed.

The check may also take further parameters into account, such as, for example, the temperature in the drive unit.

If the drive specifications can be fulfilled, there will either be no feedback to the central unit 30 or an acknowledgment. In this case, the check is repeated as a loop at regular intervals.

If, however, the drive specifications cannot be fulfilled, a feedback will be given via a feedback channel (either the control line 38 or another communication channel between the drive unit 24 and the central unit 30) as to which drive specification can be fulfilled. As an alternative, an inquiry may be made as to which speed can be currently achieved by the drive motor that is supplied with the current defined by the current limit, that is, the actual speed of the "slower" drive unit. By way of example, box 54 here illustrates the feedback that a realistic speed of 900 rpm can be fulfilled.

If one of the drive units 24 feeds back that the drive specifications cannot be fulfilled, the central unit will calculate modified drive specifications and send them to the drive units. In the exemplary case of FIG. 3, it will therefore make a general drive specification of 900 rpm (see box 56) to ensure the desired straight ahead travel of the trailer, so that the drive motors 26 of both drive units 24 can rotate at the same speed. A new drive specification may also be made which is somewhat below the currently achievable maximum speed of the "slower" drive unit. This ensures that the drive specification need not be taken back again should the rotational speed of the "slower" drive unit even slightly decrease. For example, the new drive specification may keep a "distance" of 300 rpm or 500 rpm.

In addition to taking the current individual capacity of the drive units 24 into consideration, the central unit 30 can implement further functions by means of which the actual travel motion of the trailer 10 can be adapted as precisely as possible to the predefined desired travel path. Provision may be made for a sensor 60 in the form of an acceleration sensor or angular rate sensor which can supply information about yaw motions of the trailer 10 directly to the central unit 30. The central unit 30 can match this information against the yaw motions to be expected based on the drive specifications made. For example, if a straight ahead travel is specified, no yaw motion is to be expected. If a yaw motion occurs all the same, the central unit 30 can "countersteer", so that a straight travel motion is achieved.

A further possibility for the central unit to make sure that a specified travel path and the actual travel path agree to the greatest possible extent consists in comparing the absolute rotations of the drive motors 26 and synchronize them, if required. In the case of a straight ahead travel, for example, the drive motors should make the same number of revolutions over a predetermined period of time. This can be monitored and, if required, ensured by the central unit 30. In the case of a predetermined cornering, it can be calculated based on the desired curve radius and the known distance of the two wheels 16 from each other which difference in revolutions of the drive motors 26 is necessary to cause the trailer 10 to travel a predetermined distance along the specified radius. In this case as well, the central unit 30 can make sure that the desired difference in revolutions is built up uniformly over the travel path.

The invention claimed is:

1. A maneuvering drive for a trailer, comprising a central unit, at least two drive units by which wheels of the trailer can be driven and which are controlled by the central unit, each drive unit including a checking module by which drive specifications of the central unit can be checked as to whether they can be fulfilled, and a feedback channel being provided by which the drive units can feed back to the central unit if the drive specifications cannot be fulfilled.

2. The maneuvering drive according to claim 1, characterized in that the feedback of the drive units consists in a power reduction.

3. The maneuvering drive according to claim 2, characterized in that the power reduction is triggered by a limit temperature in the drive unit being exceeded.

4. The maneuvering drive according to claim 2, characterized in that the power reduction is triggered by a desired speed being fallen short of.

5. The maneuvering drive according to claim 2, characterized in that the power reduction is triggered by a desired torque being fallen short of.

6. The maneuvering drive according to claim 2, characterized in that the power reduction is triggered by a limit value of a voltage applied and/or of a current flowing being reached.

7. The maneuvering drive according to claim 1, characterized in that the central unit synchronizes angular positions of motor shafts of the drive units.

8. The maneuvering drive according to claim 1, characterized in that when cornering, the central unit makes the control specification for the drive unit(s) on the inside of the bend taking into account the feedback of the drive unit(s) on the outside of the bend.

9. The maneuvering drive according to claim 8, characterized in that a sensor is provided which supplies a signal to the central unit which can be evaluated with regard to deviations of the trailer from a specified direction of travel.

10. The maneuvering drive according to claim 1, characterized in that a sensor is provided which supplies a signal to the central unit which can be evaluated with regard to deviations of the trailer from a specified direction of travel.

11. The maneuvering drive according to claim 10, characterized in that the sensor is an acceleration sensor.

12. The maneuvering drive according to claim 10, characterized in that the sensor is an angular rate sensor.

13. A maneuvering drive for a trailer, comprising a central unit, at least two drive units by which wheels of the trailer can be driven and which are controlled by the central unit, each drive unit including a checking module by which drive specifications of the central unit can be checked as to whether they can be fulfilled, and a feedback channel being provided by which the drive units can feed back to the central unit if the drive specifications cannot be fulfilled, characterized in that when cornering, the central unit makes the control specification for the drive unit(s) on the inside of the bend taking into account the feedback of the drive unit(s) on the outside of the bend and further characterized in that a sensor is provided which supplies a signal to the central unit which can be evaluated with regard to deviations of the trailer from a specified direction of travel.

* * * * *